United States Patent
Harlow et al.

(10) Patent No.: US 11,010,674 B2
(45) Date of Patent: May 18, 2021

(54) AXIOMATIC CONTROL OF AUTOMORPHIC DYNAMICAL SYSTEMS

(71) Applicants: James D. Harlow, San Jose, CA (US); David A. Kerley, Houston, TX (US)

(72) Inventors: James D. Harlow, San Jose, CA (US); David A. Kerley, Houston, TX (US)

(*) Notice: Subject to any disclaimer, the term of this patent is extended or adjusted under 35 U.S.C. 154(b) by 942 days.

(21) Appl. No.: 15/249,342

(22) Filed: Aug. 26, 2016

(65) Prior Publication Data
US 2017/0061290 A1  Mar. 2, 2017

Related U.S. Application Data

(60) Provisional application No. 62/211,355, filed on Aug. 28, 2015.

(51) Int. Cl.
*G06F 17/00* (2019.01)
*G06F 40/58* (2020.01)
*G06Q 30/02* (2012.01)
*G06N 5/02* (2006.01)

(52) U.S. Cl.
CPC .................. *G06N 5/022* (2013.01)

(58) Field of Classification Search
CPC ...................................... G06N 5/022
USPC ........................................ 706/1–62
See application file for complete search history.

(56) References Cited

U.S. PATENT DOCUMENTS

| | | | | |
|---|---|---|---|---|
| 2007/0087756 A1* | 4/2007 | Hoffberg | ............ | G06Q 30/0201 455/450 |
| 2007/0239403 A1* | 10/2007 | Hornbostel | .............. | G01V 3/38 702/191 |
| 2007/0299596 A1* | 12/2007 | Moritz | ...................... | G06T 7/80 701/1 |
| 2013/0191114 A1* | 7/2013 | Gim | ........................ | G06F 40/58 704/9 |
| 2016/0265881 A1* | 9/2016 | Sperber | ..................... | F41H 7/02 |

* cited by examiner

*Primary Examiner* — Brandon S Cole
(74) *Attorney, Agent, or Firm* — Compass IP Law PC

(57) ABSTRACT

Methods and systems are provided for implementing axiomatic control of an automorphic dynamical system. An automorphic system architecture for a dynamical system may apply ergodic techniques for axiomatically describing networked computing environments of vast dimensions comprised of a plurality of disparate information resources, processors, memory, storage, analog and digital sensors (as examples) and presenting this plurality of information sources as a singular automorphic resource through a time series. An example system may further implement dynamic axiomatic control and modification of operational parameters, without human intervention, incorporating data from a variety of sources and platforms and over multiple dimensions of context associated with those data.

20 Claims, 8 Drawing Sheets

Harvard Computing Model

Microkernel/Virtual Machine implemented according to Harvard Computer architecture

Princeton Computing Model (von Neumann Architecture)

Microkernel/Virtual Machine implemented according to Princeton Computing Model
(von Neumann Architecture)

AXIOMATIC CONTROL OF AUTOMORPHIC DYNAMICAL SYSTEMS

CROSS-REFERENCE TO RELATED APPLICATION

This application claims the benefit of U.S. Provisional Application No. 62/211,355, filed Aug. 28, 2015, which is incorporated by reference.

BACKGROUND

Field of the Invention

An automorphic dynamical system is a system whose operations are loosely controlled by mathematically formalizing axioms which describe the time dependence of a point's position (representing the state transitions of the system itself) in its operational space that may be represented in a plurality of manifold spaces. This type of system may unify very different types of such axioms in mathematics, for example: (A) different choices made for how time is measured; and (B) special properties of the manifold space, which may give practitioners of the art an idea of the vastness of the proper class of objects described herein, yet this vastness may be synthetically bounded in some implementations using axiomatic controls described herein.

In various implementations, time may be measured as integers, real numbers, or complex numbers, or time can be a more general algebraic object, which has discarded the parametric characteristics of its initial base state (at start-up or last phase transition) and the manifold space may be simply a set, without the need of a smooth space/time structure defined on, or in, it.

An example dynamical automorphic system may be described as a tuple $(T, M, \Phi)$ where T is a monoid, written additively, M is a set and $\Phi$ is a function:

$$\Phi: U \subset T \times M \to M$$

with:

$$I(x) = \{t \in T : (t,x) \in U\}$$

$$\Phi(0,x) = x$$

$$\Phi(t_2, \Phi(t_1,x)) = \Phi(t_1+t_2,x)$$

The function $\Phi(t, x)$ is called the evolution function of the dynamical system which associates to every point in the set M a unique clustering, depending on the variable t, called the evolution parameter. M is called phase space or state space, while the variable x represents an initial state of the system. In general—for example in the cases of discrete, real and cellular automata, dynamical systems—M is a manifold. Dynamical systems, as tuples, comprise a plurality of elements of which at least one element is a manifold.

As will be appreciated, federating various data sources and allowing queries and transactions across those sources, while the software modifies and compiles its own components to address ever-changing uses and demands upon the system, is currently not possible with the existing art and standard techniques of the field of computing.

In one real-world example axiomatic control of automorphic dynamical systems may be implemented in a networked computer environment used to build and authorize an autonomous Automorphic Mobile Robot/Drone system and, more specifically, to a sensor-enabled Automorphic Mobile Robot/Drone system for gathering intelligence and engaging in weapon-based kinetic warfare under its own self-modifying axiomatic C4 constraints (command, control, communications, and computing). Such an implementation contrasts with systems that perform autonomous mission planning in two key ways:

(1) Automorphic mission plans may evolve as events in the theater of battle evolve as is reflected in sensor telemetry. For example, no 'a priori' set of mission instructions is required, yet the boundaries within which the weapons & reconnaissance (W&R) system operate may be clearly defined by axioms of control; and (2) An Automorphic Mobile Robot/Drone system, empowered with the capacity to perform its own Relational Object programming and compilation, may include the capability to modify its own mission constraints within the bounds of axioms which act as a virtual fence around the myriad parameters which can be derived from a caucophony of sensor telemetry. In other words, the axioms can be configured to prevent an Automorphic Mobile Robot/Drone system from programming itself for harming 'friendly' objects in the theater of battle, as one such example.

However, the characteristics of self-reliant autonomy and instantaneous, stand-alone adaptation to changes in environment are useful in many contexts beyond weapons and reconnaissance systems. For example, digital rights management, deep-space travel, cybersecurity, cyberwarfare, "Smart Cars" and other forms of transportation as well as medical systems which sustain life which hangs in the balance are a few examples of other relevant fields. The concepts described herein with respect to axiomatic control of automorphic dynamical systems may be thought of, in one example, as the internet of things (IoT) on a scale we cannot anticipate even today—a von Neumann Probe of inner and outer space.

Description of Related Art

Modern weapon systems and reconnaissance systems (W&R) have increased their capabilities in recent years. Such military systems engender the same sort of hierarchical rationale of implementation and deployment in the design of weapons and reconnaissance systems. Ultimately, command and control of such military systems falls upon a chain of human beings from the stand-off pilot to the stand-off decision hierarchy to authorize a launch. A key attribute of these systems manifesting this capability increase is mobility with human-directed wire-free control from a central command post.

Conditions in the battle theater, from an empirical standpoint, have never been static and the rate at which battle theater conditions change has correspondingly increased; the ability to undertake human-directed wire-free control becomes all the more dubious when we take into account the impact of Electro-magnetic pulse weapons that wage catastrophic destruction on W&R systems that lack Faraday Cage protection. Faraday cages surrounding electronic payloads are necessary to protect the W&R system, yet, preclude the use of human-controlled wire-free command and control. A desirable evolution of such W&R systems is to empower them with autonomous capability to operate without a human-directed umbilical.

Chaos in the battle theater, combined with emergent high-energy weapon systems, underscores the need for autonomy in the deployment of W&R systems. W&R systems and other elements of military force are deployed according to a "mission profile." Subject-matter-expert mission planners review and gather intelligence concerning anticipated battlefield conditions pertaining to a particular objective and then develop a mission profile by which the objective may be attained. Mission profiles are typically based upon numerous calculations, measurements and assumptions including, but not limited to, the expected performance of deployed W&R systems, weather conditions in which the deployment occurs, capabilities of opposing weapons systems, and calculated and/or expected tactical response of the enemy and its respective W&R systems.

'A priori' planning for conditions in the theater of battle, however, sometimes obsoletes one or more assumptions on which a mission profile is developed—in popular military vernacular, "all plans modify once the first bullet flies." W&R systems may not perform as expected; weather may be worse than expected; an opposing W&R system may be more effective than expected; or the enemy might do something unexpected. In practice, we can expect one or more developments of this nature to be encountered in any operation.

Some assumptions of subject-matter-expert mission planners are more vague than others, causing mission profiles to be composed of alternative mission plans which bifurcate as predicated on the most probable contingencies. Sometimes conditions in the theater of battle are so unexpected or are of such a degree that the mission profile as a whole becomes irrelevant. In such circumstances, the mission plan typically is either aborted or otherwise fails in its military objective. There is, therefore, a need for more adaptable systems and equipment.

As battle theater conditions become more chaotic, emphasis is placed on flexibility in W&R Systems. A more flexible W&R deployment permits subject-matter-expert mission planners to contemplate a wider array of contingencies. Today, with all other things being equal, subject-matter-expert mission planners teach that "the more contingencies that can be accounted for beforehand the more likely the mission can be successfully completed". What these subject-matter-experts do not take into account is the vast array of sensor telemetry available to W&R systems in the theater of battle that could enable autonomous W&R systems to adjust to chaos in ways that cannot be anticipated.

Military and political emphasis on "standoff" W&R systems (robot/drones) has in some cases exacerbated these complexities—for example, collateral casualties sometimes occur because the human-directed wire-free command center has incomplete information which may be known in-theater. Latency in communication between W&R systems and centralized C2 (command and control) may sometimes mean a delay of several seconds or minutes between the moment of a fire control command and the resulting launch—this is critical time. For example, a telemetry may dictate that a "missile launch" command is ill-advised due to the high probability of higher than expected collateral casualties. Where 'standoff weapons' weapons are deployed against a target from a distance at which military and political personnel are relatively safe from retaliatory action, these are generally refer to these as robot/drones.

Today, standoff W&R systems are not autonomous, and thus not flexible in adapting to actual battlefield conditions. A cruise missile, as one example, is programmed, 'a priori', with a target's location and then launched. The cruise missile can arrive at a pre-programmed location accurately, but it will miss the target if the target has moved. Subject-matter-expert mission planners have few options because the W&R system is not flexible. Rapid changes in the battle theater (i.e., changed target location) cannot be contemplated in the mission profile because present weapons systems do not have that capability. The distance over which the cruise missile has to travel increases the probability of missing the target because of the duration of flight time.

Today, mission profile planning is performed manually. An "analyst" sits down with some target data about the objective. This target data may include the target's location and, if the target is mobile, information such as the target speed, target heading, target location error, and time-stamp of the data. If target information other than the target location is missing, values may be assumed. Planning the mission profile is relative if the target is stationary. However, if the target is mobile, the analyst must typically manually develop a profile under which the weapon system or reconnaissance can locate the target using only information available to the analyst before the mission has even begun. An autonomous vehicle implementing axiomatic control of automorphic dynamical systems would be capable of making such an adjustment on its own power. Such capability might include, for example, efficiently and effectively developing a search pattern that thoroughly covers the area where a target might be, incorporating real-time data available to the vehicle in the area of operation, via its own sensors and received from other equipment in the vicinity.

Many W&R systems are not capable of durable operation under stress of kinetic battle conditions, for example, a standoff weapon such as an air-to-ground missile launched from a robot/drone. Although a robot/drone need not "worry" about retaliation from the target, the launch might occur in enemy territory over which the robot/drone may be subject to hostile anti-aircraft fire. Human-directed wire-free control of the robot/drone, due to stand-off latency, is often not be able to respond quickly enough to simultaneous anti-aircraft-fire and movement of the missile's target. Sensors on the robot/drone may receive information about a target that may have be erroneous or possibly possess some error by the time the weapon is dispensed. A wire-free stand-off pilot in a distant command and control center has neither the time nor the situational awareness to calculate or promulgate a new, or more accurate, mission profile, before launching the weapon or after the missile is launched and inbound anti-aircraft fire threatens the W&R platform.

Processing power and sensor sophistication have attained such dramatic speed and capability increases in the last 15 years that the time has arrived when W&R systems can operate autonomously—without human intervention. The present invention is directed at least in part at resolving, or at least reducing, one or all of the problems mentioned above.

SUMMARY

Methods and systems are provided for implementing an automorphic system architecture for a dynamical system, for example using ergodic techniques for axiomatically describing networked computing environments of vast dimensions comprised of a plurality of disparate information resources, processors, memory, storage, analog and digital sensors (as examples) and presenting this plurality of information sources as a singular automorphic resource through a time series.

The present invention, in some embodiments, relates to information technology and particularly to an automorphic system architecture for a dynamical system and ergodic techniques (an example being ergodic transforms such as von Neumann ergodic theorems acting in Hilbert spaces) for axiomatically describing networked computing environments of vast dimensions comprised of a plurality of information resources, processors, memory, storage, and analog and digital sensors (as examples), and presenting this plurality of information sources as a singular automorphic resource through a time series.

The descriptions of some implementations teach how to create an axiom-controlled, object-oriented, software-based dynamical system for the purpose of federating heterogeneous/homogeneous systems comprised of, for example, operating systems, software applications, database systems, autonomous machinery, human-controlled machinery, and sensors or all types, into self-actuating and self-compiling, highly uncoupled, software systems (or systems of systems) without human intervention or participation even in situations where the components and/or subsystem(s) are not known at the time of system instantiation—for example, machine authorship, compilation, self-maintenance, and self-programming systems.

Case Studies

An example implementation can be, in one instance, described as an automorphic mobile robot/drone control system using Relational Object Oriented Programming ("ROOP") to implement axiomatic control to accomplish a multi-dimensional sensor-based mission sequence. A method according to one embodiment may include self-guided movement of the automorphic mobile robot/drone control system to a geographic location derived through correlation of sensor data relative to axioms of control. These axioms of control are implemented in computer instructions in order to accomplish mission success parameters contained within those axioms—for example, complete one mission, then completely or partially change its own mission instructions to accomplish a 2nd mission according to at least some of the same axioms of control.

In an example implementation, mission instructions necessary to enable the automorphic mobile robot/drone to self-control its own location are determined based on data received from any myriad of permutations of GPS unit, satellite triangulation, geomagnetic sensory data, or backscatter x-ray tomography sensors. Based on its own self-controlling instructions, the automorphic mobile/robot drone system may gather signals intelligence (SIGINT), Electronic Intelligence (ELINT), Technical Intelligence (TECHINT), with which to ultimately make, for example, a risk assessment for which to, select command decisions on its own, within fractions of a second, to formulate its own "new" mission to perform any permutation of the following outcomes—destroy, incapacitate, or ignore the detected threat.

A second example might invoke "von Neumann Probe" concepts, wherein an automorphic system architecture for a dynamical system, using ergodic techniques for axiomatically describing networked computing environments wherein a cyberwarfare "dreadnaught" (von Neumann Probe), has the capacity to dynamically adjust to enemy attempts to conduct cyberwarfare operations. The system may operate autonomously in order to disrupt, interfere with, and neutralize the cyberwarfare operations of a foe without human control.

In a third example, again invoking "von Neumann Probe" concepts, an automorphic system architecture for a dynamical system, using ergodic techniques for axiomatically describing networked computing environments may function as an autonomous weapons system. For example, command and control of robot/probes (von Neumann Probe) may have the capacity to dynamically adjust to battlefield chaos to conduct kinetic warfare operations—to operate autonomously in order to disrupt, interfere with, and/or destroy the warfare operations of a foe without human control.

In a fourth example, again invoking "von Neumann Probe" concepts, an automorphic system architecture for a dynamical system, using ergodic techniques for axiomatically describing networked computing environments, may function as an autonomous wingman (autonomous pilot) to a human flight leader. For example, command and control of robot/probes (von Neumann Probe) may have the capacity to dynamically adjust to air combat chaos to conduct flight operations—to operate autonomously in order to disrupt, interfere with, and/or destroy the warfare operations of a foe without human control, or, in other cases process and analyze and push solutions/alternative courses of action to a human pilot, or act autonomously, at a rate and volume beyond human capability.

In a fifth example, again invoking "von Neumann Probe" concepts, an automorphic system architecture for a dynamical system, using ergodic techniques for axiomatically describing networked computing environments, may function as an autonomous wingman (autonomous pilot) to a human flight leader. For example, command and control of robot/probes (von Neumann Probe) may operate in subsea/submerged conditions as unmanned escorts of a plurality of vessels (surface and submerged) to dynamically adjust to combat chaos to conduct undersea battle operations—to operate autonomously in order to disrupt, interfere with, and/or destroy the warfare operations of a foe without human control, or act autonomously, at a rate and volume beyond human capability.

In a sixth example, again invoking "von Neumann Probe" concepts, an automorphic system architecture for a dynamical system, using ergodic techniques for axiomatically describing networked computing environments, may function as autonomous flying and submerged ordnance with a capability to find its own targets without human intervention or commands. For example, command and control of robot/probes (von Neumann Probe) may operate as self-propelled, and self-directed, swarms of small (zero radar footprint) explosive drones as members of a defensive weapon configuration to protect high-value assets. These high-value assets, for purposes of this specification may be any assets deemed by military and civilian leadership to be worthy of such defenses (for example, nuclear power plants, civilian population centers, aircraft carriers, Nuclear-powered submarines, etc). In one example, as Aircraft Carrier escorts (surface and submerged) explosive drones dynamically adjust to combat chaos to conduct airborne and undersea "defensive shield" operations against hypersonic missiles that have the ability to avoid large radar-footprint obstacles. These explosive swarms operate autonomously in order to disrupt, interfere with, and/or destroy the warfare operations of a foe without human control, or act autonomously, at a rate and volume beyond human capability and the capabilities of most W&R systems. Such autonomous explosive drone swarms are empowered with sensors to detect launch of a missile, then detonates fragmentation ordnance to explode in immediate path of hypersonic missile or ultra-fast torpedoes. The swarm reacts to sensor telemetry to coordinate and configure itself as a metaphorical 'mace' which emerges from the sea, or air, to create a 3-Dimansional flak and high-pressure zone to damage missile-based navigation and hypersonic propulsion systems. Again, acting autonomously at a rate and volume beyond human capability.

Figure 1:
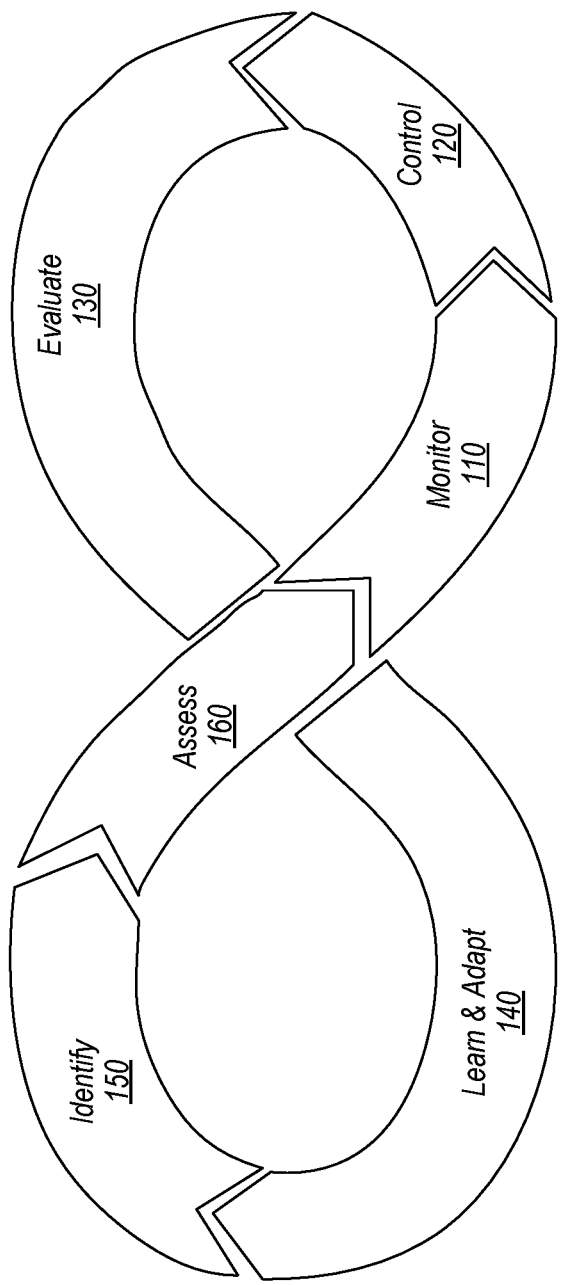
FIG. 1 illustrates a visual conceptualization of example of processes according to some implementations of axiomatic control of automorphic dynamical systems.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described here may implement axiomatic control of automorphic dynamical systems.

Principles and Terms

The techniques described herein make possible the merging of various known systems into axiom-controlled meta-systems composed of diverse sets of "systems of systems". In particular, this document describes the construction of a relational object-oriented, software-based system to create, update, delete, and compile to machine code, if necessary, the requisite system components. The following are merely examples from a plurality of highly decoupled components potentially utilized in a system implementing techniques described herein:

axioms: the plurality of axioms referred to herein are limitless. However, an example of one is called a "smales axiom A" which displays diffeomorphism as follows: "Let M be a smooth manifold with a diffeomorphism f: M→M. Then f is an axiom A diffeomorphism if the following two conditions hold: 1) the non-wandering set of f,$\Omega$(f) is a hyperbolic set and compact, and 2) the set of periodic points off is dense in $\Omega$(f)." As may be appreciated by those having ordinary skill in the art, in the above example (in a system which exhibits "Smales axiom A" diffeomorphism), stability of the system is maintained by axioms to bound operations within 1st and 2nd standard deviations of behavior thus limiting the manifold dimensions and self-stabilizing the system. Another example of an axiom according to various implementations is represented as 'von Neumann-Morgenstern'axioms of completeness, transitivity, continuity, and independence'. In this specific example, an economy of operations is established with a currency of risk metrics. In such an axiom set, the automorphic system may evaluate its own operational risks as those risks pertain to satisfying demand for appropriate outcomes during state transitions;

grammars: the structure of an axiom language consisting of syntax and morphology (including inflections) and sometimes also phonology and semantics. In one example the grammar used for axiom construction may be triliteral root grammars as found in semitic languages. The use of triliteral grammars, as axiom building blocks, are intended to act as a step in the process of reducing the axiom to a 'ternary tree' or a 'three-way radix quicksort' function.

uncoupled components of a system previously compiled; and data structures.

The underlying first principles of this System are generally described, for example in "von Neumann-Bernays-Gödel set theory" (NBG) and Ergodic Theory and Dynamical Systems Theory. In addition to the foregoing, this System may, in one of a plurality of circumstances, practice re-entrant and/or reflective software methods utilizing, in one of a plurality of examples, reflexive and compound relationships among elements of said atomic sentences. One having ordinary skill in the art will appreciate the unique contribution of this disclosure, for example providing an axiom-based set of atomic sentences used by algorithms and computer processor instructions to formulate an infinite number of operational states in many coincident time periods performing multi-dimensional operations as pertains to a specific operational domain.

An automorphic dynamical system according to various implementations may be a system that is self-modifying and patterned after itself. This type of system may be a canonical isomorphism of itself. The symmetry of all objects comprising the system (and systems of systems), and the means of relating them, may be self-contained. The system can be self-modifying to the extent that its algorithms/heurisitics, axioms and manifold boundaries establish the baseline parameters by which the system operates in any given state—when the limits of those algorithms/heurisitics, axioms, and manifold boundaries begin to decay in efficacy, the system can discard them and insert a new collection of algorithms/heurisitics, axioms, and manifold boundaries to accomplish the operational goals defined by the those manifolds.

An example of a dynamical system, refactored as an automorphic dynamical system, is a Kronecker Dynamical System, which is an isomorphic to a system where, upon comparison, a compact abelian metrisable topological group emerges; Kronecker Dynamical systems have particular definitions as described herein:

Definition 1 (Equicontinuous and isometric systems): Let (X, F, T) be a topological dynamical system:
1. We say that the system is isometric if there exists a metric d on X such that the shift maps $T^n:X \to X$ are all isometries, thus $d(T^n x, T^n y) = d(x,y)$ for all n and all x, y. (Of course, once T is an isometry, all powers $T^n$ are automatically isometries also, so it suffices to check the n=1 case.)
2. We say that the system is equicontinuous if there exists a metric d on X such that the shift maps $T^n:X \to X$ form a uniformly equicontinuous family, thus for every $\epsilon > 0$ there exists $\delta > 0$ such that $d(T^n x, T^n y) \leq \epsilon$ whenever n, x, and y are such that $d(x,y) \leq \delta$. (As X is compact, equicontinuity and uniform equicontinuity are equivalent concepts.)

Definition 2 (Kronecker system): A topological dynamical system (X, F, T) is said to be a Kronecker system if it is isomorphic to a system of the form (K, $\mathcal{K}$ S), where (K+$\mathcal{K}$) is a compact abelian metrisable topological group, and S:x→x+α is a group rotation for some α∈K.

An ergodic system and concomitant ergodic techniques, according to some implementations, may include a collection of stochastic processes that possess statistical properties that can be deduced from a sufficiently long sample of the process being measured. Any sample from the process must represent the average statistical properties of the entire process, so that regardless of what sample you choose, it represents the whole process, rather than just a specific section of the process. A process that changes erratically at an inconsistent rate is not said to be ergodic, but rather, a system prone to perturbation requiring one or more multi-dimensional vector-quantization algorithms to force convergence and self-stabilization upon the system in question.

A canonical isomorphism may include a canonical map that is an isomorphism. Two objects are canonically isomorphic if there is a canonical isomorphism mapped between them. For example, the canonical map from a finite-dimensional vector space V to its second dual space is a canonical isomorphism; on the other hand, V is isomorphic to its dual space but not canonically in general. In the domain of canonical isomorphism, there are two basic isomorphisms that can be expressed via abstract algebra and thus reduced to algorithmic instructions for a computer:
1. Group isomorphism, an isomorphism between groups; and
2. Ring isomorphism, an isomorphism between rings. (Note that isomorphisms between fields are typically referred to as ring isomorphisms).

Algebraic topology may algebraic objects to study topologies formed by a plurality of proper classes.

Multi-dimensional operations may include those operations that are germane to a specific industry, business unit, unit-of-work, or lifecycle, as well as roles within an organization/entity across a plurality of time sequences and locations.

An atomic sentence is a type of declarative sentence which is either true or false (it may also be referred to as a postulate, proposition, statement or assertion) and which cannot be broken down into other simpler sentences. For example "The dog ran" is an atomic sentence in natural language, whereas "The dog ran and the cat hid." is a molecular/compound sentence in natural language.

Von Neumann-Bernays-Gödel set theory (NBG) includes an axiomatic set theory that is an extension of canonical Zermelo-Fraenkel set theory (ZFC). A defining facet of NBG is the distinction between proper class and set. For example, if we allow G and J to be two individuals, then, the atomic sentence is defined if G is a set and J is a class. In other words, G∈J is defined unless G is a proper class. Further, NBG set theory stipulates that in order for an axiom to meet the criteria of containing an atomic sentence, then, the members of the set G must be members of proper class J.

A proper class according to some implementations is "the class of all sets", the universal class called V. A proper class has no known limitations in the same way there are infinite real numbers between 0 and 1; but it does not define "the set of all sets" such as the infinite real numbers between 0 and infinity.

A vector according to some implementations is a relationship from a set of information objects of a first type to a set of information objects of a second type, and assembling user interfaces per the user-interface objects.

By NBG's axiom schema of Class Comprehension, all objects satisfying any given formula in the first-order language of NBG form a class; if a class is not a set in Zermelo-Fraenkel set theory (ZFC), it is an NBG proper class. The development of NBG classes mirrors the development of naive set theory.

A naive set describes the aspects of mathematical sets familiar in discrete mathematics (diagrams and symbolic reasoning about Boolean algebra), and suffices for the everyday usage of set theory concepts in contemporary mathematics reduced to machine executable instructions via software. The principle of abstraction is given, and classes can be formed out of all individuals satisfying any statement of first-order logic whose atomic sentences all involve either the membership relation or predicates definable from membership. Equality, pairing, subclass, and such, are all definable and so need not be axiomatized—their definitions denote a particular abstraction of a mathematical formula reduced to machine executable instructions via software.

An example implementation of the techniques described herein may include a software system described within itself. This means, for example, that all of the software instructions to execute instructions in the processor may be stored within the invention as a knowledge base. In addition to the software instructions, the software contains definitions of axiomatic description, the necessary subsystem to formulate and test axioms, and the ability to translate those axioms into machine-executable instructions. The software system, for purposes of discussion, can be thought of (in one of many implementations) as a relational database designed to be self-referential and re-entrant based upon reflection methods to interrogate and test parametric limits. In an example relational database, the database contains all known atomic sentences, codification of those sentences into machine readable instructions, definitions of axiom terms, compilers, and variables (global, private, static or otherwise). Functions and arguments may be known primitives. Functions may correspond to classes and functions that can be used as arguments correspond to sets of code, parameters, compiler 'command-line' arguments, and data dictionaries.

Reflection is a software method whereby the system is self-referential. This is achieved in some implementations by describing the invention within the invention. According to some implementations, early validation that the components therein are correct is established in the fact that the invention must execute against itself. Object and class traversal may be accomplished via vectors that describe how an object can be reached from other objects (e.g., parametrically, logically, and physically). Objects and classes may be linked by describing what type of object (data source) is to be reached and on the basis of what possible attribute values of that object.

For any set's operational characteristics (and characteristics of "systems of systems"), x and y, there is a set, {x,y}, whose elements are exactly x and y such that there is only one set of characteristics that will match an outcome. In traditional object-oriented software development, object behavior, e.g. services, methods, attributes, etc., are defined by a "class", so it is important for practitioners of the art to understand that software objects-where all objects of a particular class have the same behavior-should not be confused with objects and classes of NBG set theory but should instead be thought of as members of the set of proper class of objects in a set. Traditional approaches typically require that any changes to behavior be implemented by programming a new software-based class and ensuring that the new software-based class is a member of the proper class of sets. In contrast, rather than adapting behavior by creating or changing software-based classes, various implementations described herein use a special multi-purpose class designed to implement behavior through sets of configurable, multi-purpose software-based components being a plurality of object types and classes therein.

The ontology of NBG provides a framework for speaking about "large objects" without risking paradox in the form of an infinite loop in the software instructions. In some developments of category theory, for instance, a "large category" is defined as one whose objects make up a proper class, with the same being true of its morphisms. A "small category", on the other hand, is one whose objects and morphisms are members of some set. We can thus easily speak of the "category of all sets" or "category of all small categories" without risking paradox. Those categories are large, of course. There is no "category of all categories" since it would have to contain large categories which no category can do.

In an embodiment of the invention, a method for exposing sets or instances of information objects comprises steps which may include all or some of the following:
1. creating an object method (software) for a plurality of object characteristics of a particular type of an information object, and
2. including a name of each of the plurality of object characteristics of the particular type in a signature of the object method.

The plurality of possible software-based object characteristics includes the example types of service, property, event, and relationship. Software methods of the invention may further comprise the step of implementing a common interface, wherein the common interface allows access to instances of information objects by name or by 2-Dimensional or 3-dimensional geospatial position.

A feature of various implementations of the techniques described herein is that objects of any kind can be referenced in multiple dimensions, where those dimensions (e.g., time, location, etc.) may, at-once, be virtually organized (e.g., into hierarchies, hash-key pairs, ternary hash combinations, or MapReduce storage). A typical user's view of information data sources may be controlled by a virtual index structure that uses the attributes of the user that uniquely identify the user in order to identify the appearance and behavior that a software object in the invention presents to the user.

A virtual index structure according to some implementations can be a federation of data sources which might include, among others, software rights management repositories, network access control systems, LDAP, operating system permission indexes, and many others. These attributes can include (among others) username, roles, language, locale, and organization. As may be appreciated, such a system allows constraint of objects and its services that are available to a user. Thus an environment and available views thereof may be sensitive and responsive to the context of a user or other component of the system. These context-sensitive model-view-controller formulations, according to some implementations may be described as Vector Relational Data Modeling (VRDM), for example such implementations as described in U.S. patent application Ser. No. 14/725,215.

An example Vector Relational Data Model according to some implementations may be a virtual entity comprised of at least four requirements:
1. the data element (or object) source(s);
2. the relationship;
3. the characteristic of the relationship; and
4. the use of the relationship by the information objects.

VRDM may provide all four of those constructs as information objects. This capability may be important, for example, to proper class construction of services, properties, and relationships. The relationships between information objects and their services may be expressed through varying configurations germane to the operational characteristics needed at that moment.

Information objects that manage software components may be assembled according to vectors which define relationships between those software components. As such, the construction of a collection of relationship objects and data objects constitutes an entirely new method of software construction referred to here as Relational Object Oriented Programming.

In some implementations, once the system has been provisioned to comprise all axioms, implementation code, parameters, compilers, data, sensors and attributes necessary for autonomous operation, the automorphic aspects of the system communicate with other components which may implement a collection of stochastic measures/methods such as multi-dimensional vector quantization algorithms, multi-dimensional stochastic vector quantization algorithms which implement various forms of artificial neural network algorithms, and/or feedforward neural network algorithms to perform backpropagation through any particular time series in order to return to a prior operational state. The purpose of these stochastic measures/methods is to insure that the dynamical system as described herein remains within the boundaries of its operational specification as described by one or a plurality of axioms and thus trained to optimize its parameters in a plurality of different operational states.

As operational demands force various operational parameters (increased or decreased bandwidth/packet demand, additional transient of persistent storage, or new data sources from which to gather further axioms, as examples) to exceed their first and second standard deviations of acceptable activity, a new collection of axioms may be constructed to correct the Dynamical System back to a set of parameters inside the Proper Class of the task objects in question.

"Acceptable activity" according to some implementations may be defined and encapsulated in the form of axiom parameters which define both dimension and expanse of the proper class of task objects. These axiom parameters may, in one example, be all of the characteristics of a virtualized environment that may be relevant to a specific vendor, or alternatively may be the configuration parameters of a sensor operating as a data source for the system in question.

Those new axiom(s) may be translated into machine-executable instructions which, in turn, cause the system to recompile those highly uncoupled software components relevant to, and affected by, the axiom(s).

Once those new software components have been compiled, all publish-and-subscribe message queues may be interrogated by said components in order for those components to retrieve new functional rules from a local knowledge base intrinsic to the system. These functional rules, which may also be known as aximodels, may be prioritized according to axioms that determine whether they should be treated as "first-in-first-out" (FIFO) or "last-in-first-out" LIFO aximodels; once prioritized they are indexed according to varying forms of indexing (i.e. 'hash-key pairs', 'ternary trees' or a 'three-way radix quicksort') function. Functional rules of the system, or aximodels, are generally pre-provisioned (designed and installed 'a priori') in anticipation of serving a baseline function. New aximodels may be created by a subsystem (called the aximodel refinery) of the system via stochastic processes. A purpose of these stochastic processes may be to formulate atomic sentences and convert those atomic sentences to machine-executable instruction, which may, for example, instruct the system in new operational states.

According to various implementations, in the event the system lacks the ability to self-modify components to meet new demands, even after applying stochastic methods, the system may broadcast, via a proprietary protocol, a request for an aximodel to fulfill the operation parameters which it broadcasted.

An aximodel may be expressed in a plurality of forms, a simple example of which is shown below (concatenated atomic sentences) wherein the verbose axiom grammar is illustrated adjacent to the trilateral axiom example:

Atomic Sentence #1—verbose (MAC addr must be 12.34.21.xx.xx.xx)=(L2:MAC EQ 12.34.21.XX.XX.XX)

Atomic Sentence #2—verbose (IP address must be 192.168.255.255)=(L3:IP EQ 192.168.XXX.XXX)

Atomic Sentence #3—verbose (transport will be via UDP)=(L4:TRN EQ UDP)

Atomic Sentence #4—verbose (UserID must be verified against MS ActiveDirectory)=(L5:UID EQ MAD)

Atomic Sentence #5—verbose (HTTP traffic is not necessarily encrypted, but may be encrypted, and all software applications require SSL/TLS)=(L6:HTP NEQ NCR:APP EQ NCR)

Atomic Sentence #6—verbose (packet rates not to exceed 1 Mbit/second)=(L2:PRT LT 1 MBP)

After concatenation by an aximodel refinery according to some implementations, the triliteral examples shown above look like: L2:MAC EQ 12.34.21.XX.XX.XX|L3:IP EQ 192.168.XXX.XXX|L4:TRN EQ UDP| L5:UID EQ MAD|L6:HTP NEQ NCR:APP EQ NCR)|L2:PRT LT 1 MBP. This aximodel may then be converted into a series of octets that are readily hashed or stored in one of a plurality of binary tree structures for search and retrieval.

The lifecycle of an automorphic dynamical system according to some implementations may be straightforward in that it performs like many other software systems with the exception that the "learn and adapt" functions may be a collection of autonomous uncoupled components which receive telemetry from remote sensors and evaluate or identify where there is a change in state. Control may then be handed off to an autonomous refinery that constructs aximodels on-demand.

FIG. 1 represents a visual conceptualization of example of processes according to some implementations of axiomatic control of automorphic dynamical systems.

The Monitor phase 110 may refer, at least in part, to the operations of a sensor network (software and/or hardware) as described in further detail elsewhere herein.

The Control phase 120 in some implementations may be a reentrant operation conducting parameterized modification of network component configurations and computers to meet demands.

The Evaluate 130 phase in some implementations may represent re-entrant and reflective aspects, for example, whereby the aximodel refinery algorithmically compares, states are changed, or measurements are algorithmically evaluated.

The Learn & Adapt phase 140 may be reflexive in nature, wherein frequent changes can precipitate application of various neural network algorithms applied to stochastic methods.

The Identify 150 phase may include identifying and signaling various states or events, for example, signaling to other components of a system when a 2nd standard deviation of any parameter is about to be exceeded.

In various implementations, the Assess phase 160 may include measuring and weighing risks of identified deviations according to their impact, and initiating remediation when necessary.

The automorphic software life-cycle, such as represented in FIG. 1 can thus be continuously reentrant, reflective, and reflexive in nature.

Use Case

A straightforward use case for an example system could include a system to evaluate ICBM missile launches in order to determine which launches are false-positives. For example, consider the situation where an ICBM sensor array, conventionally terrestrial and orbital, seemingly provides conflicting and confusing missile-launch signals. In such an example, observers at a command console cannot actionably determine whether the "alerts" being displayed on their computer monitors and wall displays are irrefutable and actionable.

This example problem may be clinically broken down into several components:

1. sensors—machines that use hardware and software to constantly seek and report tell-tale signals of missile engine ignition;

2. telemetry being transmitted from sensors (satellite-based sensor relays and airborne sensor arrays in planes/drones) in the form of digital and analog electromagnetic radiation transmitted at non-specific frequencies and radiant power;

3. accumulation, verification, synchronization and normalization of sensor telemetry into a form that can be readily translated into binary transmission within a network of computers dedicated to command, control, communications and computers (C4); and 4. prioritization of verified, synchronized, and normalized sensor telemetry translated into 2-dimensional avatars for visual display to subject matter experts via computer monitors and wall-displays.

Whenever "positive launch" avatars "activate" to alert observing humans that a launch has occurred, a cascade of events of a truly vital outcome must occur within a very narrow window of time in order to either stand-down or respond "in-kind"-where possible. This problem is exacerbated by the geographic location of seemingly "positive launch" avatars activating to indicate a "positive launch" has occurred within 50 miles of national borders and boundaries. The window of time within which a cascade of truly vital events must necessarily occur is compressed into seemingly impossible time band.

The systems and techniques described herein may, in some implementations, be used to address those narrow windows of time within which a "stand down" or "respond" order is issued. But the problem solved isn't really at the avatar point of observation. Rather, the solution provided by this system begins much earlier than that.

In the case of sensors, an example system will be able to autonomically federate test data to determine whether or not the sensors are transmitting error-ridden states that mimic tell-tale signals of missile engine ignition. Once the sensor test data has been authenticated by an aximodel, the system of this example would then federate the raw telemetry transmission logs and use an aximodel to validate and authenticate the sensor states reflected in the logs are, in fact, representative of what's showing up in the on-screen avatars. In the event the preceding autonomic aximodel test has authenticated that the states displayed via avatar are "false positives", then the example system may run an autonomic aximodel to federate low-level OSI Stack sensors installed within each of the computers in the C4 network to inquire if there has been suspicious activity from internal IP addressed of the C4 network.

Once the general location of the "false positive" launch data is located, the systems may run an aximodel to interrogate the avatar logs, then correlate the time of "false positive" appearance the time that are reset to reflect the sensor state as found in original sensor telemetry logs. In the event this process of authentication fails to correlate a "false positive" then an actionable response to an "authenticated positive" launch can be authorized (or in some cases, not authorized, according to system design and requirements). This example use of an autonomic automorphic dynamical system that, without human intervention, reaches out into diverse systems, arrives at a conclusion of whether a missile launch can be authenticated, then provides timely decision support criteria to a human being to act upon is an improvement on currently available systems.

In the case of "positive launch" signals, where a submarine launches from within, for example, 50 miles of national borders, this system may be deployed to use aximodels to authenticate a submarine launch and orchestrate a drone-based response using equipment which may already be stationed in that theater of action, without human involvement. As may be appreciated, the example system in this use case has acted upon two (2) very different uses cases simultaneously—specifically, the system is simultaneously monitoring a global sensor array and knows to relinquish automated response when it involves targets on land, but can use an aximodel to also determine if an automated response, without human interaction, can be conducted because the aximodel instructs the system to do so if the "positive launch" occurs within, or about, offshore maritime boundaries.

Architecture

An Automorphic Dynamical System according to some implementations may calculate boundaries of its manifold of operation according to axioms of control. The Automorphic Dynamical System may then assign threads to each unit of work within the system according to taxonomies and priorities asserted by axioms. Another way of looking at it is that the Automorphic Dynamical System parses units of work into threads (equivalent in definition to a POSIX thread). Threads may then be aggregated into thread bundles, these bundles representing an aggregation of threads of execution enumerated according to a radix of choice (for example, depending upon need, binary, ternary, sexigesimal, etc).

Thread bundles may be executed by a micro-processor or multi-processing unit which may perform the execution in a plurality of symmetric multi-processor, clustered multi-processor, or streaming multi-processor models. The threads of a thread bundle can be identified (by interrogating an index) using one-dimensional ($\alpha$), two-dimensional ($\alpha$, $\beta$), or three-dimensional indexes ($\alpha$, $\beta$, $\gamma$). Regardless, $\alpha \times \beta \times \gamma \leq \Phi \alpha \times \beta \times \gamma <= \varphi$; where $\Phi$ is the sum of cores $-1$.

$$\alpha \times \beta \times \gamma \leq \Sigma |\mu cores - 1|$$

(one core, or processing unit, is set aside to handle indexes).

Thread bundles, as described above, may be organized according to some implementations into Thread Bundle Groups (TBG). An arbiter implemented in hardware or software allocates thread bundles to symmetric multi-processors (SMP), clustered multi-processors (CMP), or streaming multi-processors (StMP). Once a thread bundle is distributed to any of a SMP, CMP or StMP, the resources for the thread bundles are allocated (shared memory and private memory) and threads are divided into enumerated groups of threads called 'binary thread Groups (BTG), or Ternary Thread Group (TTG) or Sexigesimal Thread Group (STG) depending upon the radix implemented in the Automorphic Dynamical System in question. Once a group of thread bundles is allocated, it is therein referred to according to its radix value i.e. 'BTG1', 'TTG5', 'STG9'. Regardless of classification of the thread group, each thread bundle may be associated with an aximodel to guarantee Proper Software Class construction of services, properties, and relationships, the relationship between information objects and their services, properties and relationships according to sensor input, axioms of control and current capabilities.

An Automorphic Dynamical System can be implemented singularly, or in plurality, as one or more microkernel/ Virtual Machines (M/VM), executing instructions on microprocessor cores, or multi-processor cores, using private memory space, communication with other M/VMs via shared memory space which acts as a publish and subscribe mechanism, and code execution models according to the Harvard Computing model.

Figure 2A:
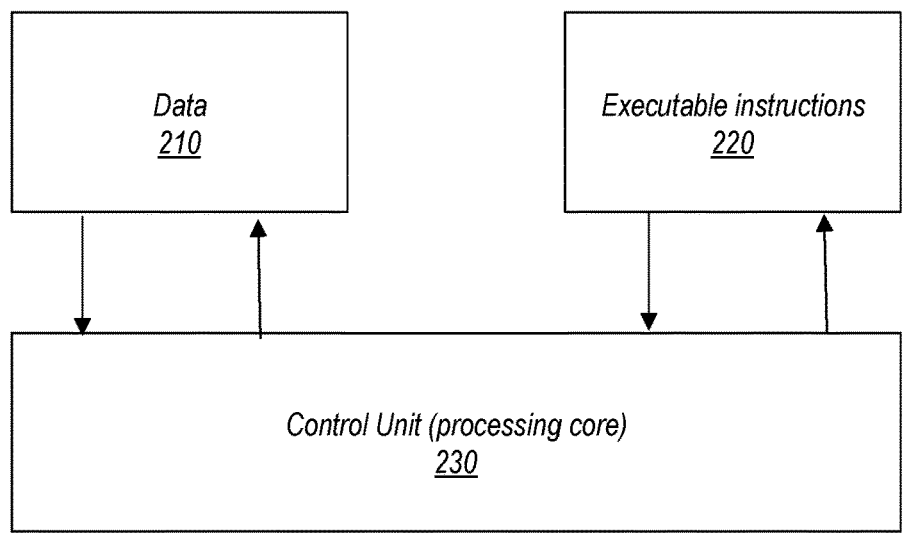
FIG. 2A illustrates a block diagram of an example implementation of the Harvard Computing Model, according to some embodiments.

FIG. 2A illustrates a block diagram of a simple example implementation of the Harvard Computing Model, wherein a central processing core or control unit 230 reads and writes data 210 and accesses executable instructions 220, typically via physically separate storage and signal pathways. An example virtual machine implementation in the block diagram of FIG. 2B includes a virtual control unit 235 reading and writing data 215 and executable instructions 225 via logically and/or physically distinct storage and signal pathways.

According to some implementations, a Virtual Machine may be defined to be any permutation of the following:

1. software instructions, expressed as software components, which comprise a runtime environment. This runtime environment virtualizes complete hardware platforms, certain logical abstractions of instruction execution components, or only that which is minimally, and functionally required to run various operating systems. Virtualization hides the physical characteristics of a computing platform from the users and software components, presenting another abstract computing platform which may simplify software execution; or, 2. conduct paravirtualization when implemented. Paravirtualization is a virtualization technique that presents a software interface similar to, but not identical to, that of the underlying micro-processor or multi-processor. This narrows the scope of software instruction formulation and reduces the potential for mistakes or fault conditions to arise.

Figure 2B:
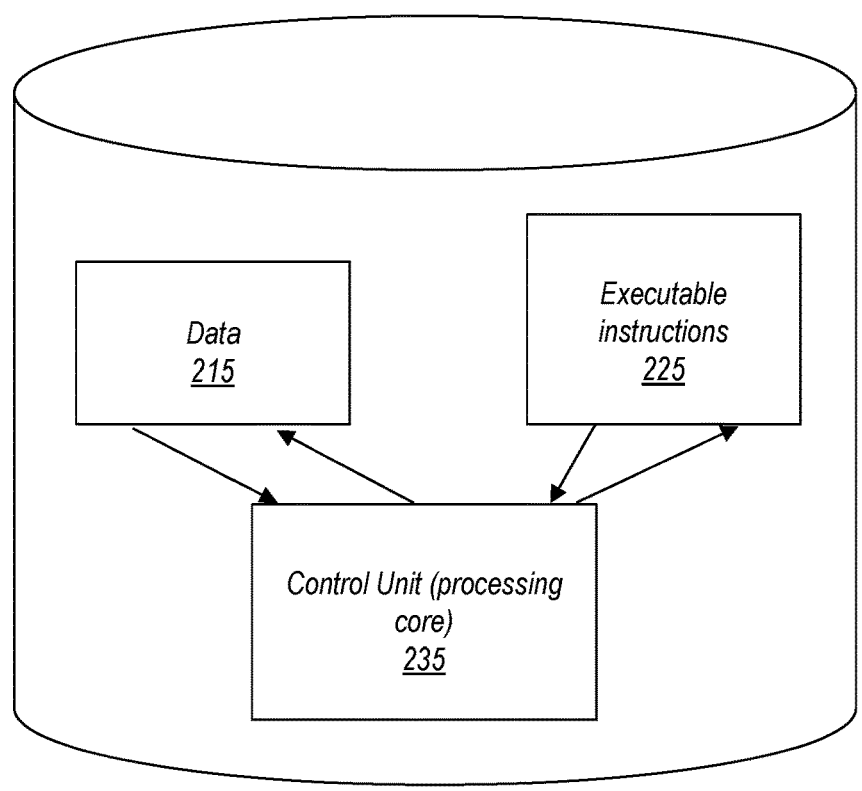
FIG. 2B illustrates a block diagram of an example microkernel/virtual machine implemented according to the Harvard Computer architecture, according to some embodiments.
Figure 3A:
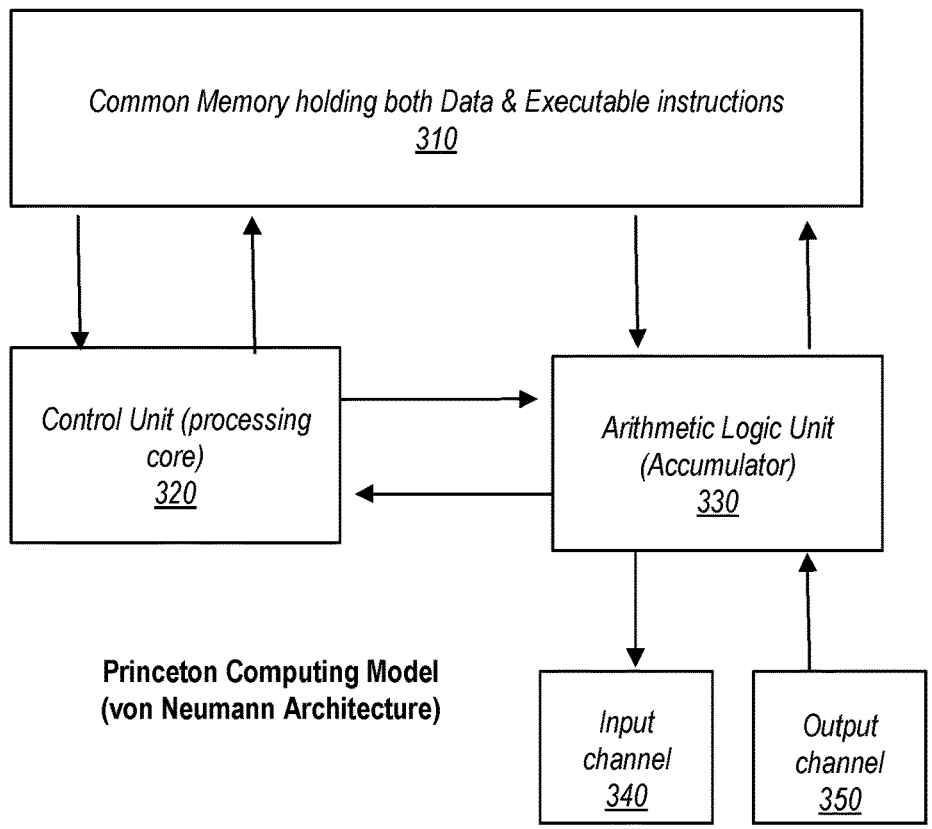
FIG. 3A illustrates a block diagram of an example implementation of the Princeton Computing Model (Von Neumann architecture), according to some embodiments.
Figure 3B:
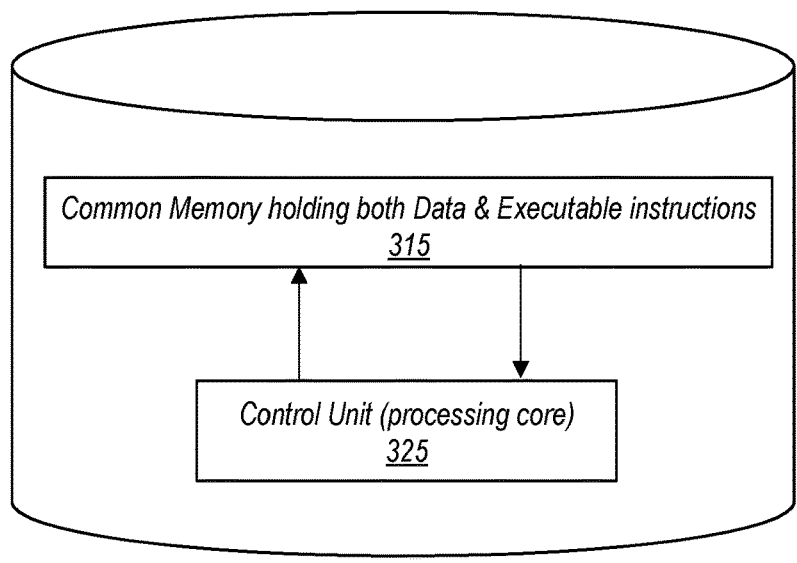
FIG. 3B illustrates a block diagram of an example micokernal/virtual machine implemented according to the Princeton Computing Model (Von Neumann architecture), according to some embodiments.

In an example implementation, the aforementioned collection of M/VMs may, in turn, be controlled by a collection of Automorphic Dynamical Systems implemented in a Princeton computing architecture. FIG. 3 illustrates a block diagram of a simple example implementation of the Princeton Computing Model, wherein a control unit 320 and arithmetic logic unit (ALU) 330 communicate with a common memory 310 which holds both data and executable instructions. In some implementations, arithmetic logic unit 330 may also send and receive data via input channel 340 and output channel 350. An example virtual machine implementation of this architecture is shown at FIG. 2B, which includes a virtual control unit 325 communicating with a virtual common data and executable instruction memory 315.

Automorphic Dynamical System M/VMs may afford the in-process update of execution instructions without passivating or stopping processes of the Harvard-model M/VMs. For example, each Automorphic Dynamical System may include a collection of highly uncoupled software modules. Each of these Princeton-model M/VMs may implement a shared memory space which acts as a Publish and Subscribe mechanism to allow for communication between the Harvard-model M/VMs and their Princeton-model Automorphic Dynamical System controllers.

Each of the Princeton-model M/VMs, in turn, may implement Aximodels to store a collection of uncompiled software instructions, compilers, drivers, compiled code test facilities, which comply with axiomatic vector spaces of operational capability. As described above, aximodels may be pre-provisioned (designed and installed 'a priori') in anticipation of serving a baseline function by the Automorphic Dynamical System Controllers as deviation from satisfaction of axiomatic control functions exceed 2nd standard deviation.

According to some implementations, new aximodels may be created by any of the Automorphic Dynamical System Controllers (called the aximodel refinery) of the system via stochastic processes. A purpose of these stochastic processes is to formulate atomic sentences for efficient inter-process communication according to a publish-and-subscribe mechanism, whereby each atomic sentence is translated into machine-executable instruction that instructs the system in new operational states.

In the event the system lacks the ability to self-modify components of the aximodels to meet new demands, even after applying stochastic methods, the system will broadcast, via a proprietary protocol, a request for an aximodel to fulfill the operation parameters which it broadcasted to a support node to acquire such capability. An aximodel may be expressed in a plurality of forms yet the exemplary implementation is expressed in ternary content addressable memory (TCAM), and/or equivalent, such that any subsystem of the larger system has access to the aximodels of other Automorphic Dynamical System Controllers in the event of a fault.

At present, 'central processing unit' (CPU) architectures favor multi-core execution of instructions. The designers of these CPU dictate, generally, whether the cores of the processor will executing instructions according to a 'complex instruction set computing' (CISC) model or in a 'reduced instruction set computing' model (RISC) where a CPU is designed for higher performance when combined with a microprocessor architecture capable of executing those instructions using fewer microprocessor clock cycles per instruction. Regardless of architecture, such instructions can be executed in a symmetric or clustered multi-processing model depending upon how individual execution cores handle instructions.

In some architectures, the CPUs noted above are composed of processor assemblies which embed thousands of highly-specialized processor cores (alternatively called 'graphic processing units' or GPUs) to perform , A computer which includes the following two characteristics is generally referred to as having a "Harvard" architecture. Namely, the computer will be designed with separate instruction and data stores, and independent buses will be provided to enable the central processing unit ("CPU") of the computer to communicate separately with each of these stores. This is in contrast to a "von Neumann" or "Princeton" based computer architecture, which generally employs the same physical store for both instructions and data, and a single bus structure for communication with the CPU.

Figure 4:
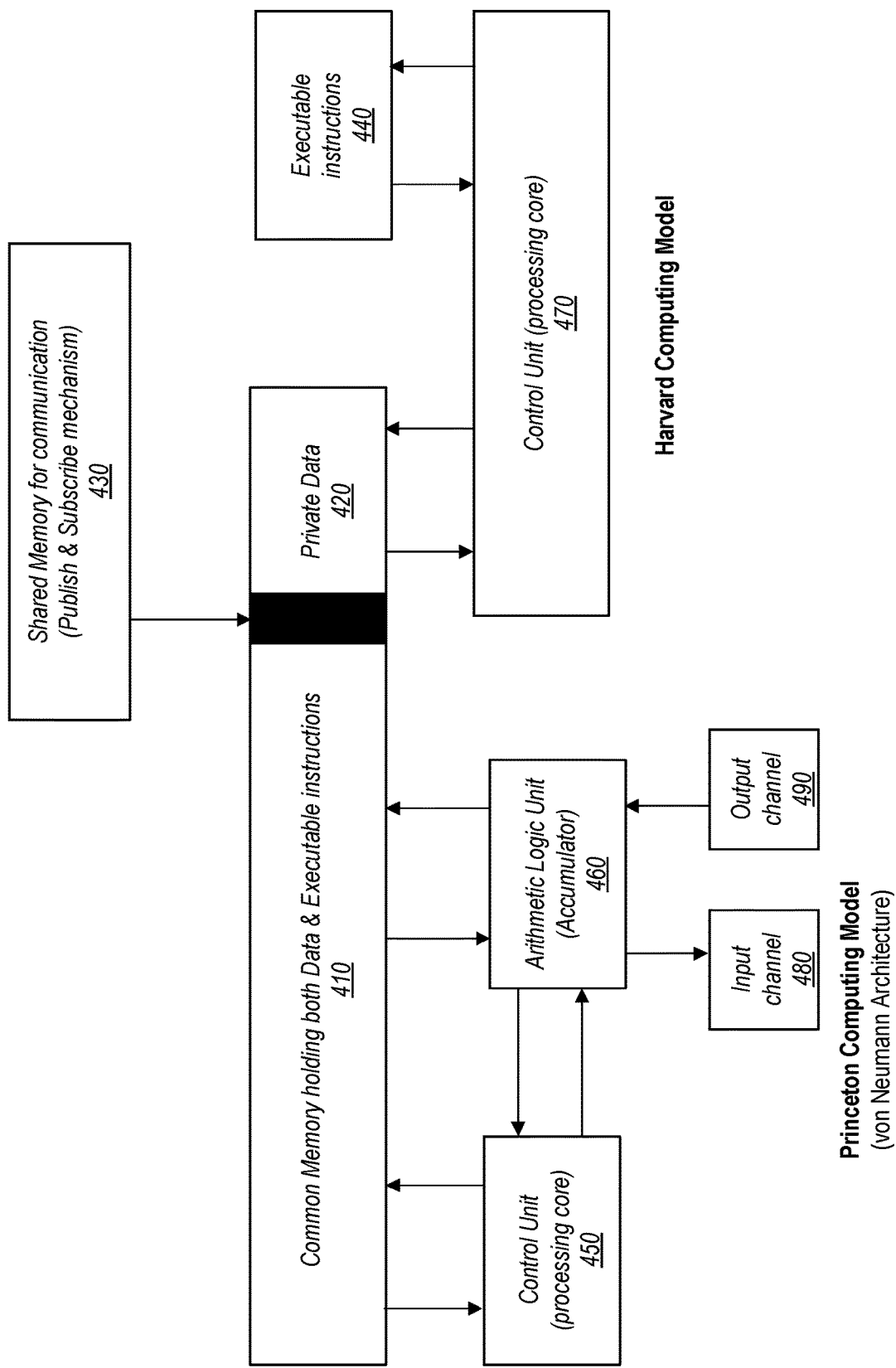
FIG. 4 illustrates a block diagram of an example publish-and-subscribe model mechanism, according to some implementations.

FIG. 4 shows a block diagram of a simple example publish-and-subscribe methnanism. The system of FIG. 4 combines a Princeton Computing Model architecture with a Harvard Computing Model system as described above. Common memory 410 of the Princeton system maintains communications paths with processing core 450 and ALU 460. Input channel 480 and output channel 490 serve ALU 460. The Harvard section of the system of FIG. 4 includes a control unit 470, which accesses private data 420 and executable instructions 440 via dedicated and separate paths and signals.

The Princeton and Harvard segments of the system of FIG. 4 share a memory 430 for communicating information between them. Shared memory 430 may include information of both common memory 410 and private data 420, for example, where such information is relevant to both segments of the system of FIG. 4. Read and write operations to shared memory 430 according to some implementations may be accomplished using a publish-and-subscribe mechanism. Either segment of the system of FIG. 4, for example, may subscribe to updates of shared memory 430, for example for certain concepts or contexts. Although FIG. 4 shows a single Harvard Computer Model segment, any number of relevant such segments may be served, via shared memory 430 or another similar memory shared between the additional Harvard segment and the Princeton segment of FIG. 4.

In general, a publish-and-subscribe access system according to some implementations may be configured wherein one publisher (M/VM) can send a message to many subscribers (a plurality of M/VMs) through a virtual channel called a topic. A topic may be regarded as a mini-message broker that gathers and distributes messages addressed to it. By relying on the topic as an intermediary, message publishers are kept independent of subscribers and vice-versa. A topic automatically adapts as both publishers and subscribers come and go. According to one embodiment of the invention, publishers and subscribers are active. Subscribers are the components (M/VMs) which are subscribed to receive messages in a topic. Any messages addressed to a topic are delivered to all the Topic's subscribers.

The publish-and-subscribe messaging model according to some implementations defines a "push-based" model, where messages are automatically broadcast to subscribers without them having to request or poll the topic for new messages. In the publish-and-subscribe messaging model the publisher sending the message is not dependent on the subscribers receiving the messages. Optionally, the components that use this model can establish durable subscriptions that allow components to disconnect and later reconnect and collect messages that were published while they were disconnected.

Figure 5:
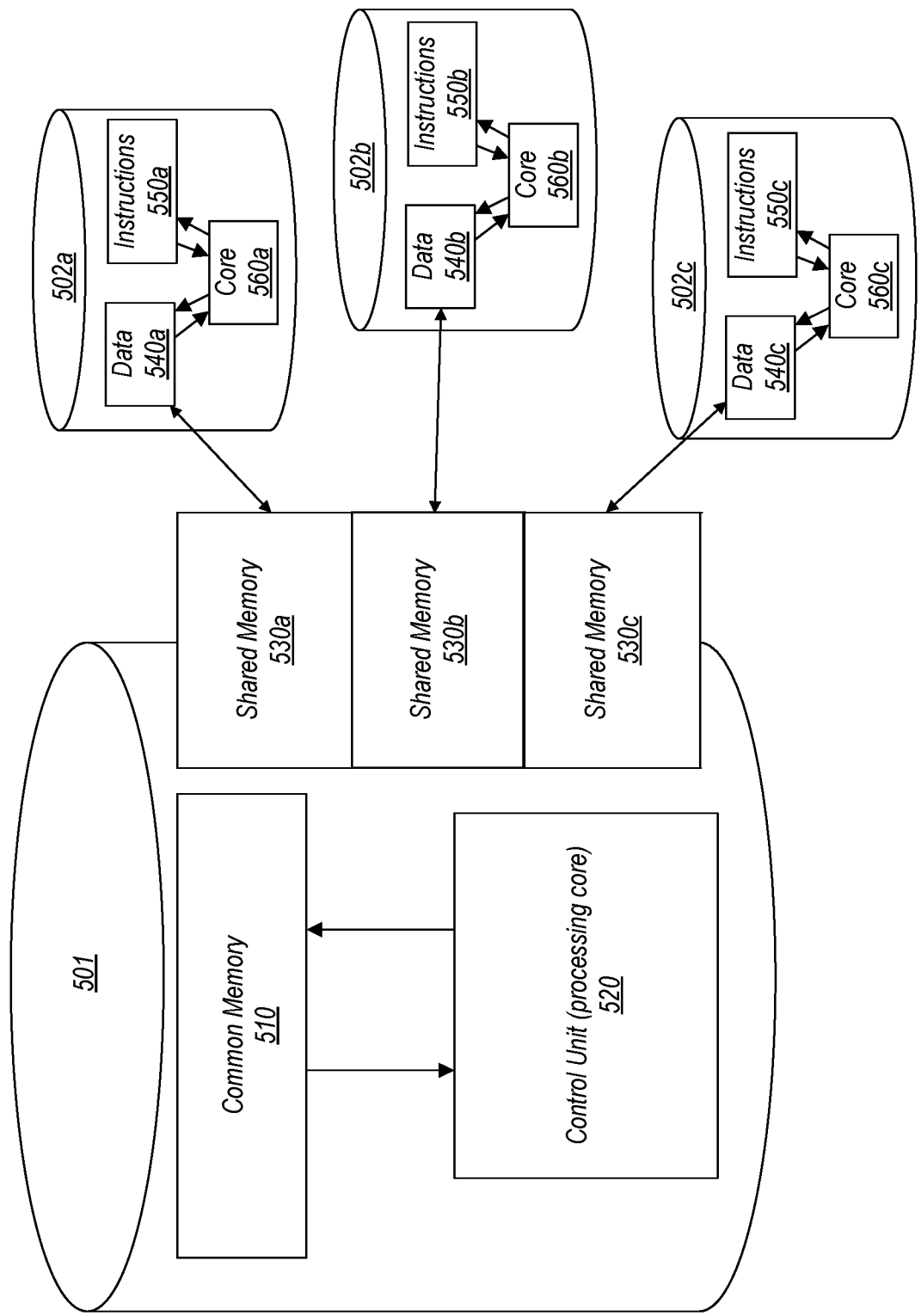
FIG. 5 illustrates a block diagram of an example virtualized publish-and-subscribe model, according to some embodiments.

FIG. 5 illustrates a block diagram of an example virtualized publish-and-subscribe model, according to some embodiments. In the example embodiment of FIG. 5, a common virtualized memory 510 of a Princeton-style system 501 communicates with a control unit 520 of system 501. System 501 may further associate one or more shared memory segments 530a-530c for sharing data with systems 502a-502c. In the example implementation of FIG. 5, systems 502a-502c are illustrated as virtualized Harvard-style systems, however one having ordinary skill in the art will understand that various other combinations of systems including Princeton-style systems or traditional, non-virtual systems would be compatible with the principles, methods, and systems described herein. In the example implementation of FIG. 5, each system 502 includes a core 560 in communication via separate baths with a data 540 and instructions 550.

One having ordinary skill in the art will appreciate that the example systems illustrated in this disclosure represent only a small subset of possibilities using similar or identical architectures at to those described in detail. For example, any permutation of one-to-one, one-to-many, many-to-one, or many-to-many architectures may be implemented in association with the methods and systems described herein for implementing axiomatic control of automorphic dynamical systems. Additionally, for example, any combination of real, physical, or virtual implementations may be combined as necessary or desired. Similarly, any permutation of Princeton, Harvard, or other suitable base computing architectures may be associated together with one another in an example implementations of axiomatic control of automorphic dynamical systems in accordance with the methods, systems, and principles described herein.

Figure 6:
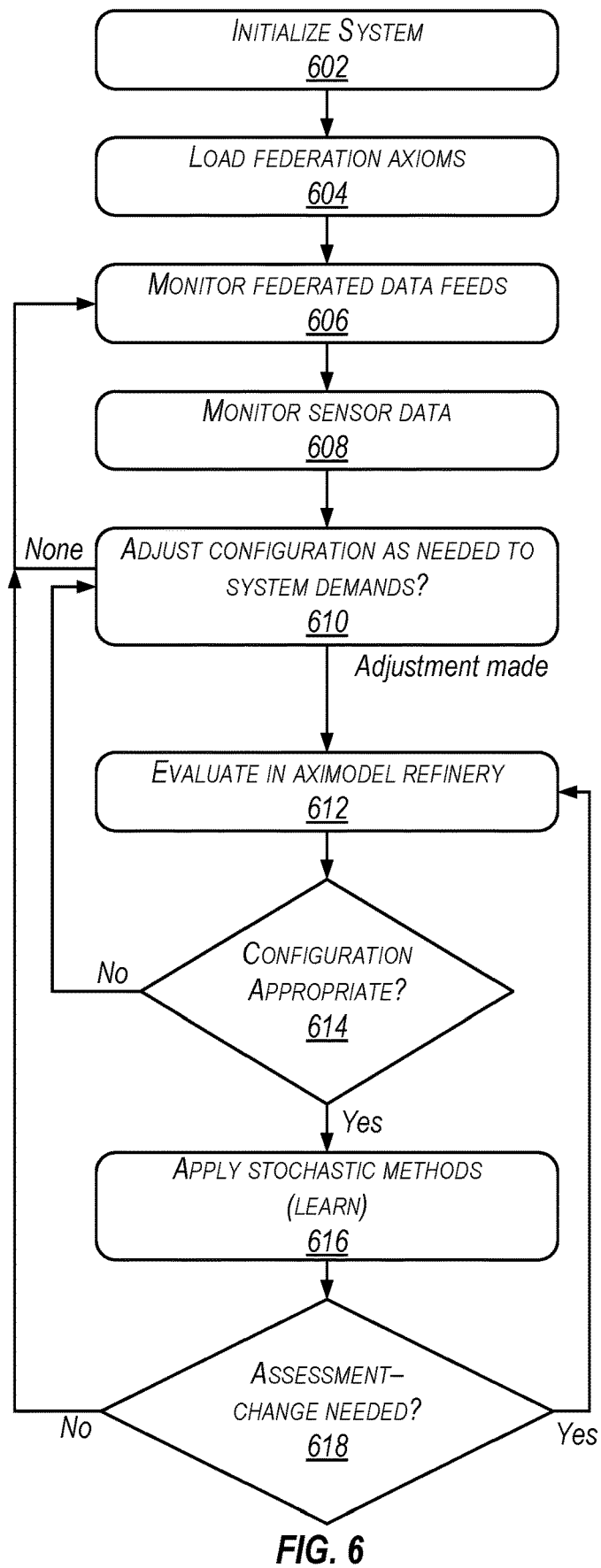
FIG. 6 is a high-level flowchart illustrating various methods of implementing axiomatic control of automorphic dynamical systems, according to some embodiments.

FIG. 6 shows an example process according to some implementations described herein. At step 602, the system is initialized. In some implementations, this step may include a "bootstrap" or other appropriate initialization procedure, as described in further detail herein with reference to FIG. 7.

At step 604, system axioms related to federation of sources are loaded. At step 606, federated data feeds are monitored, while at step 608, federated sensor data is monitored. Steps 606 and 608 in some implementations may be thought, at least in part, to embody a "Monitor" phase as described herein with reference to FIG. 1.

At step 610, the system adjusts network and components as needed according to demands on the system, including using various known methods of resource management known in the field of computing, as appropriate. Step 610 in some implementations may be thought, at least in part, to embody a "Control" phase as described herein with reference to FIG. 6. When a configuration adjustment is required and made, control passes to step 612.

At step 612, an aximodel refinery according to various implementations described herein evaluates system adjustments and may construct additional aximodels or modify existing aximodels, as appropriate. At step 614, an evaluation of new configurations and aximodels is undertaken. If further revisions are required, control passes back to step 610. If the configuration are appropriate, control passes to step 616. Steps 612 and/or 614 in some implementations may be considered to embody, at least in part, an evaluation phase as described herein with reference to FIG. 1.

At step 616, stochastic methods are applied according to various implementations described herein. Step 616 in some implementations may be considered to embody, at least in part, a learn & adapt phase as described herein with reference to FIG. 1.

At step 618, an assessment is undertaken whether further changes are needed. Step 618 in some implementations may be considered to embody, as least in part, an identify and/or assess phase as described herein with reference to FIG. 1.

Figure 7:
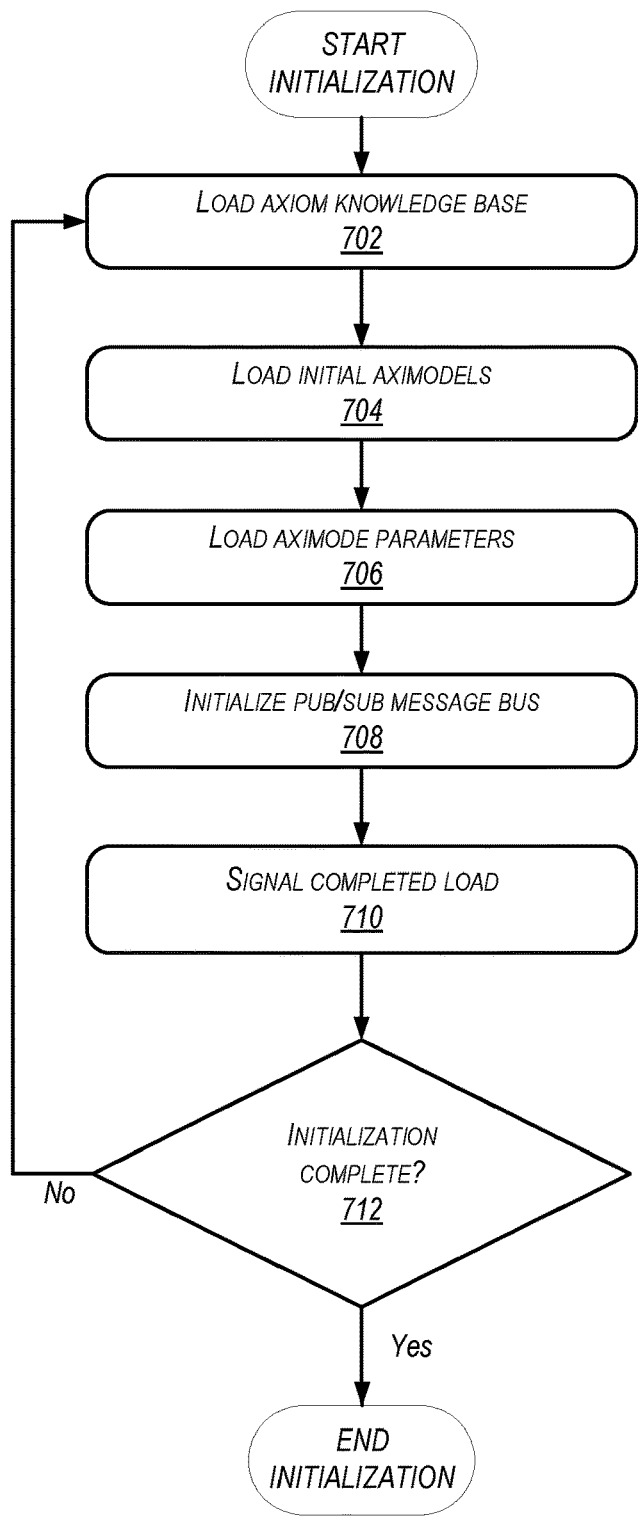
FIG. 7 is a high-level flowchart of a boostrap or initialization procedure related to implementing axiomatic control of automorphic dynamical systems, according to some embodiments.

FIG. 7 represents a more detailed description of a boostrap or initialization process of various implementations of a system described herein. For example, the steps of FIG. 7 may be included in step 602 of FIG. 6. At step 702, an axiom knowledge base is loaded. At step 704, initial aximodels are loaded. At step 706, aximode parameters are loaded. At step 708, a pub/sub message bus may be initialized. At step 710, a signal is sent to represent that the load is completed.

At step 712, if initialization is complete the initialization routine ends. For example, if the routine of FIG. 7 is within step 602 of FIG. 6, control would then pass to step 604 of FIG. 6. If initialization has not properly completed, control passes back to step 702.

Figure 8:
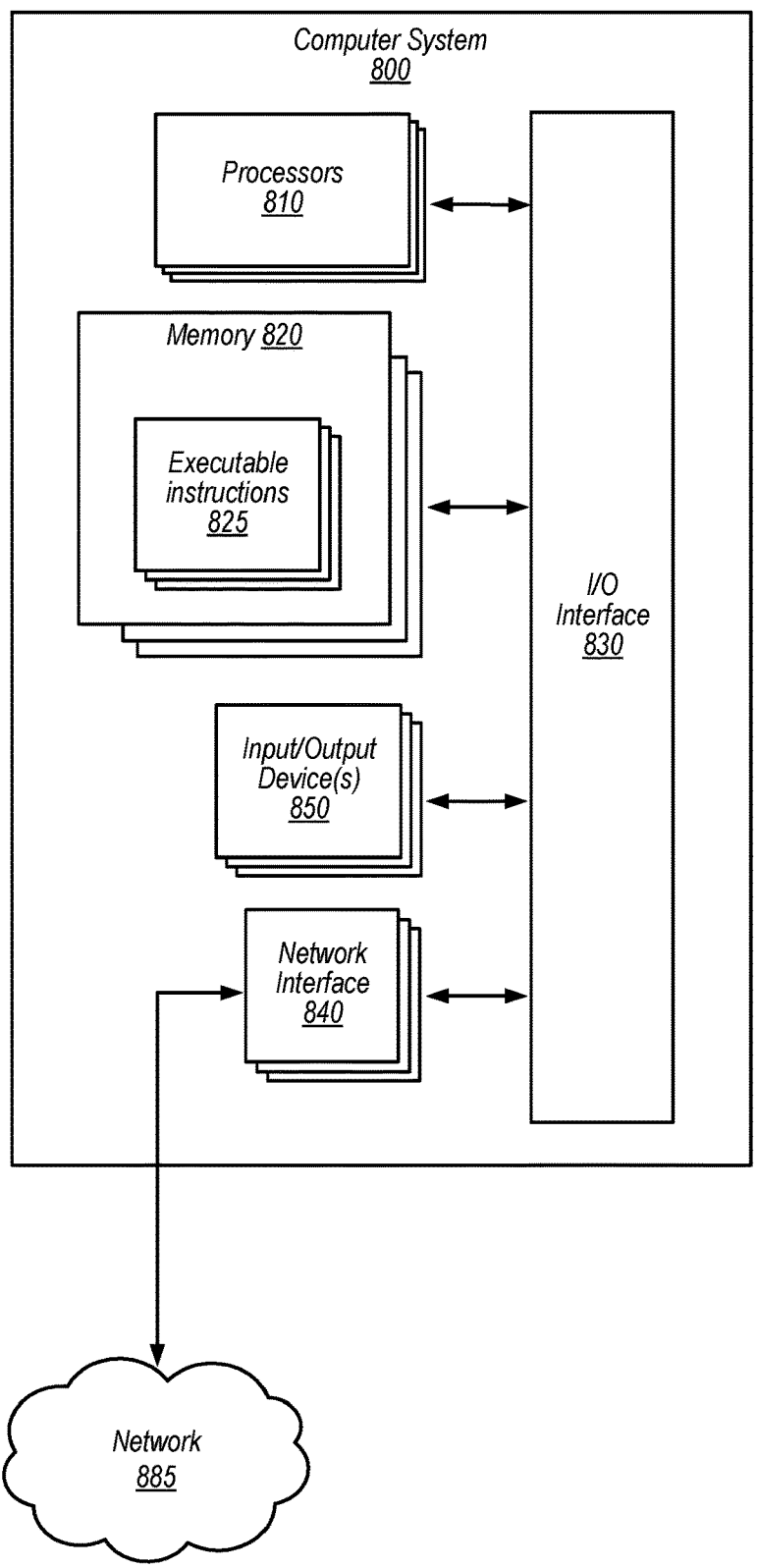
FIG. 8 illustrates a computer system that may be configured to include or execute any or all of the embodiments described herein.

FIG. 8 illustrates a computer system that may be configured to include or execute any or all of the embodiments described herein. In different embodiments, computer system 800 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of automated capture of image data for points of interest may be executed in one or more computer systems 800, which may interact with various other devices. Note that any component, action, or functionality described above with respect to FIGS. 1 through 8 may be implemented on one or more computers configured as computer system 800 of FIG. 8, according to various embodiments. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices, which can include one or more user interface (also referred to as "input interface") devices. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store program instructions, data, etc. accessible by processor 810. For example, memory 820 of computer system 800 may include executable instructions 825 for performing various tasks. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 820 may be configured to implement some or all of a traffic direction gesture recognition system, incorporating any of the functionality described above. Additionally, existing control data of memory 820 may include any of the information or data structures described above. In some embodiments, program instructions and/or data may be received, sent or stored upon different types of computer-accessible media or on similar media separate from system memory 820 or computer system 800. While computer system 800 is described as implementing the functionality of functional blocks of previous Figures, any of the functionality described herein may be implemented via such a computer system.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network 885 (e.g., carrier or agent devices) or between nodes of computer system 800. Network 885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 800. Multiple input/output devices may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

Memory 820 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An autonomous system comprising:
   multiple sensors to generate separate data streams to monitor a changing condition that causes a deviation from a planned sequence of operations including a first operation representing a first state of the autonomous system and a first transition to a second operation representing a second state of the autonomous system, the planned sequence of operations bounded by axioms that define boundaries of permissible autonomous operations to transition from one operation to another operation in the sequence of operations; and
   a processor to compute an autonomous adjustment to the planned sequence of operations based on the changing condition as indicated by the separate data streams, including to compute an updated operation bounded by the axioms including a second transition from the first operation to a third operation representing a third state of the autonomous system and a third transition from the third state to the second state, and compute relational vectors to define the second and third transitions to generate an updated sequence of operations; and, autonomously execute the updated sequence of operations.

2. The autonomous system of claim 1, wherein at least one of the multiple sensors comprises a sensor to monitor an environmental condition.

3. The autonomous system of claim 1, wherein at least one of the multiple sensors comprises a telemetry sensor.

4. The autonomous system of claim 1, wherein at least one of the multiple sensors comprises a publish-and-subscribe communication channel.

5. The autonomous system of claim 1, wherein the processor is to compute the updated operation based on comparison of the separate data streams for the changing condition.

6. The autonomous system of claim 1, wherein the planned sequence of operations comprises a pre-planned autonomous mission objective.

7. The autonomous system of claim 1, wherein the planned sequence of operations comprises a previously updated sequence of operations in response to an additional deviation of the condition.

8. The autonomous system of claim 1, wherein the processor to compute the updated operation bounded by the axioms comprises the processor to:
   compute a subset of operations within the boundaries of permissible autonomous operations; and
   select the third operation from the subset of operations.

9. The autonomous system of claim 1, further comprising:
   a communication system to receive a new axiom to update the defined boundaries of permissible autonomous operations to an updated boundaries;
   wherein the processor is to re-evaluate the sequence of operations based on the updated boundaries, and compute the updated operation based on the updated boundaries.

10. The autonomous system of claim 1, further comprising the processor to:
    identify one of the axioms as incompatible with the defined boundaries of permissible autonomous operations as defined by other axioms; and eliminate the one axiom that is incompatible with the defined boundaries of permissible autonomous operations from use in subsequent computations of updated operations.

11. The autonomous system of claim 1, further comprising:
a control target system to autonomously implement the sequence of operations.

12. The autonomous system of claim 11, wherein the control target system comprises an autonomous weapons system.

13. The autonomous system of claim 11, wherein the control target system comprises an autonomous vehicle guidance system.

14. The autonomous system of claim 1, wherein autonomously executing the updated sequence of operations comprises autonomously executing the updated sequence of operations for an autonomous weapons system or an autonomous vehicle guidance system.

15. A method comprising:
receiving, at an axiomatic control system of an autonomous system, multiple separate data streams to monitor a changing condition that causes a deviation from a planned sequence of operations including a first operation representing a first state of the autonomous system and a first transition to a second operation representing a second state of the autonomous system, the planned sequence of operations bounded by axioms that define boundaries of permissible autonomous operations to transition from one operation to another operation in the sequence of operations by the autonomous system operating autonomously;
computing an adjustment for autonomous execution of the sequence of operations based on the changing condition as indicated by the separate data streams, including:
computing an updated operation bounded by the axioms including a second transition from the first operation to a third operation representing a third state of the autonomous system and a third transition from the third state to the second state; and
computing relational vectors to define operation transitions within the sequence of operations to relate the updated operation to the sequence of operations to generate an updated sequence of operations; and
autonomously executing the updated sequence of operations.

16. The method of claim 15, wherein receiving the multiple separate data streams comprises receiving environmental condition data or telemetry data.

17. The method of claim 15, wherein receiving the multiple separate data streams comprises receiving data through a publish-and-subscribe communication channel.

18. The method of claim 15, wherein computing the update operation bounded by the axioms comprises:
computing a subset of operations within the boundaries of permissible autonomous operations; and
selecting the third operation from the subset of operations.

19. The method of claim 15, further comprising:
receiving a new axiom to update the defined boundaries of permissible autonomous operations to an updated boundaries;
re-evaluating the sequence of operations based on the updated boundaries; and
computing the updated operation based on the updated boundaries.

20. The method of claim 15, further comprising:
identifying one of the axioms as incompatible with the defined boundaries of permissible autonomous operations as defined by other axioms; and
eliminating the one axiom that is incompatible with the defined boundaries of permissible autonomous operations from use in subsequent computations of updated operations.

* * * * *